Patented Feb. 15, 1944

2,341,907

UNITED STATES PATENT OFFICE 2,341,907

PROCESS OF REMOVING ACIDIC CONSTITUENTS FROM FLUIDS

Harold C. Cheetham, Philadelphia, and Robert J. Myers, Elkins Park, Pa., assignors to The Resinous Products & Chemical Company, Philadelphia, Pa., a corporation of Delaware No Drawing. Application April 9, 1941, Serial No. 387,687

13 Claims. (Cl. 210—24)

This invention relates to a method of treating fluids whether gaseous or liquid to remove acid-forming constituents therefrom and has for its objects the purification of such fluids including the removal of acidic or acid-forming gases, the replacement of acid-forming anions from solutions, and the exchange of anions in liquids containing an ionizable substance.

Heretofore resins prepared from aminobenzenes have been proposed for the removal of anions and the purification of liquids. These resins have a moderate capacity for anions but are deficient in that they swell considerably in water, soften, tend to disintegrate, and often discolor the liquid being treated. They lack, therefore, the physical properties which are required for successful use in purifying liquids in regenerative cycles. It has, therefore, been proposed to modify the resins made from aromatic amines, that is, amines in which nitrogen is directly attached to an aromatic nucleus, but the various proposals have not brought about the needed balance of good capacity and acceptable physical properties. Similarly, this balance has not been attained in the aliphatic polyamine resins hitherto known. In fact, the reaction products of such amines and methylenic compounds are too soluble, thermoplastic, and soft to permit practical application in the purification of aqueous solutions, water, or other fluids.

The objects of this invention, therefore, include the provision of nitrogenous resinous compositions which are capable of absorbing acidic constituents from fluids and the provision of methods whereby fluids may be purified from acidic constituents contained therein without suffering from the disadvantages and deficiencies of the prior art.

These objects are accomplished by contacting a fluid containing an acidic or acid-forming constituent with a resinous composition comprising the insoluble nitrogenous reaction product of a methylol-forming phenol, formaldehyde, and a non-aromatic amine having at least one reactive hydrogen atom attached to the amine nitrogen.

The insoluble products of this type are obtained by reacting a methylol-forming phenol and a non-aromatic primary or secondary amine with formaldehyde in an amount at least molecularly proportional to both phenol and amine to form a gel and heating this gel to form an insoluble resin at a temperature between about 70° C. and the scorching temperature of the resulting resin.

The preparation of some of the phenol-formaldehyde-amine resins which are particularly valuable and effective for the purposes of this invention are described in co-pending applications Serial Nos. 387,683, 387,684, 387,685, 387,686, and 387,688, all filed on even date. Other resins of similar type may be prepared with variation in the type of phenol or type of amine.

The phenol used may contain more than one nuclear hydroxyl group and/or other nuclear substituent, such as alkyl, alkoxy, aryloxy, acyl, aryl, aralkyl, alicyclic, or other similar group. The phenol may be monocyclic or polycyclic. Typical phenols are phenol itself, the various cresols and commercial mixtures thereof, tert.-butyl phenol, amyl phenol, octyl phenol, diisobutyl phenol, cyclohexyl phenol, phenyl phenol, diphenylol, resorcinol, catechol, catechol-type tannins, diphenylol dimethyl methane, diphenylol sulfone, the naphthols, benzyl phenol, allyl phenol, etc. Any phenol having hydrogen available in positions ortho or para to the phenolic hydroxyl group may be used. Such phenols are generally called "methylol-forming phenols."

The amine may be any non-aromatic primary or secondary amine and may contain both primary and secondary amine groups. The term "non-aromatic amine" is used to describe those amines in which the amine nitrogen is not directly attached to a phenyl nucleus as in aniline or phenylene diamine. The proportion of non-aromatic amine to phenol may vary from a minimum ratio of amine to phenylol group of one to four, on a molar basis, to a maximum ratio of four to one. Examples of suitable non-aromatic reactive amines are methylamine, dimethylamine, ethylamine, diethylamine, butylamine, dibutylamine, octylamine, octylmethylamine, 2-ethylhexylamine, di-2-ethylhexylamine, benzylmethylamine, methylbenzyl ethylamine, ethylene diamine, diethylene triamine, triethylene tetramine, tetraethylene pentamine, hydroxyethyl ethylene diamine, propylene diamine, piperazine, morpholine, piperidine, pyrrolidine, cyclohexylamine, methylcyclohexylamine, etc. The amine may be a commercial mixture of different non-aromatic amines or of primary and secondary non-aromatic amines of the same general type. Not only free amines may be reacted, but also their acid salts, such as the hydrochlorides or acetates. The amine may contain other functional groups, which are essentially neutral in character, such as hydroxyl or amido. Thus, there may be used aminoalkylene carboxylic amides such as N-aminoethyl malonamide or N-aminoethylaminoethyl acetamide, or polyamino alkanols such as aminoethyl aminoethanol, etc.

In the reaction formaldehyde may be used as an aqueous or solvent solution, may be added in the form of a gas, or may be obtained at least in part from methylenic compounds including polymers, such as paraformaldehyde or hexamethylene tetramine, etc.

The resins obtained by reaction of a phenol, formaldehyde, and non-aromatic non-tertiary amine are of the phenol-formaldehyde type and have at least one aminomethyl group as a substituent of the phenyl nucleus. They may be prepared in the presence of an organic solvent which is voltailized in the hardening of the resin. They may, if desired, be extended with inert carriers, such as silica, alumina, etc.

The resins obtained, as has been described above, are extremely effective in the treatment of fluids for the absorption or adsorption of an acid-forming constituent therefrom. The term "fluid" is used to include both gases and liquids. The term "acid-forming constituent" includes those anions which, in conjunction with hydrogen ions, yield acids, and also substances which in conjunction with water yield acids. Typical anions are chloride, bromide, iodide, nitrate, sulfate, chloroacetate, propionate, acetate, etc. Typical substances giving acids in water are hydrogen chloride, hydrogen bromide, hydrogen iodide, sulfur dioxide, sulfur trioxide, hydrocyanic acid, hydrogen sulfide, formic acid, vapors of volatile acids, such as acetic, propionic, etc.

Not only may acids be removed, but anions of one type are replaceable by anions of another type. Thus, sulfate may replace chloride or vice versa depending on mass action, by proper adjustment of the ions within the resin, as will be further described. On the other hand, acid-forming anions may be replaced by hydroxyl groups if the resin has been activated with a substance yielding free hydroxyl ions. It should be noted in this connection that it is not established that the hydroxyl group always replaces the acid-forming anion. The mechanism appears more probable in the case of the resins herein described to consist in the absorption of acid molecules, leaving an excess of hydroxyl ions in solution. This mechanism is particularly evident in the removal of acidic gases or vapors from gaseous mixtures, in which case acid-forming constituents are completely and readily eliminated from such mixtures. It should be particularly noted that the removal of acid-forming constituents is not confined to aqueous solutions. The resins of the type here described are effective for the removal of acidic constituents also from organic solvents. For example, fatty acids may be removed from benzene or naphtha solutions, acids or anions from alcoholic solutions, etc.

In conjunction with the removal of acid-forming anions, there may be used a hydrogen-exchange zeolite or resin to remove cations. When a hydrogen-exchange material is used in its acid form and an anion-exchange material in its basic form, complete removal of salts becomes possible. The removal of salts is of considerable importance in the purification of organic materials. For example, the removal of salts from sugar solutions increases the recovery and quality of sugar therefrom. Gelatin and other proteins may be freed of inorganic materials. Various organic pharmaceuticals may be separated from inorganic materials by treatment of their solutions with acid and base exchange agents.

The treatment of fluids may be performed batchwise or continuously. Where a given anion is to be removed from a solution or replaced with another acid-forming anion, a suitable amount of resin may be added to a given amount of such solution and the mixture stirred or allowed to stand, liquid and resin being subsequently separated. In many cases, however, and particularly in the case of gases the fluid may be continuously run through a bed of the resin until the resin is saturated in respect to the removed acid-forming material. In either method of treatment, the resin may be regenerated or revivified. When it is desired to remove an acid-forming anion or gas, the resin may be revivified with an alkaline solution, such as a solution of potassium hydroxide, sodium hydroxide, ammonium hydroxide, sodium carbonate, or the like. Where the operation is purely one of ion exchange, the resin is restored to its desired effectiveness by contact with a solution containing the desired anion. Excess regenerative solution is readily removed by washing.

The following examples illustrate the removal or exchange of typical acid-forming constituents.

EXAMPLE 1

An insoluble resin was prepared from one mol of phenol, one mol of dimethylamine, and four mols of formaldehyde by reacting the components to form a nitrogenous gelatinous condensate, and heating the condensate at about 130° C. for about 15 hours. The resin was washed with water, with dilute soda ash solution, and again with water, and air-dried. 200 mg. of this resin was stirred for an hour into 120 cc. of a solution of sulfuric acid containing 814 parts per million of sulfuric acid. At the end of this time the residual concentration was 455 parts per million giving an adsorption value of 214 milligrams per gram of resin as the adsorption value.

EXAMPLE 2

An insoluble resin was prepared by mixing one mol of phenol, 3 mols of formaldehyde, and one mol of triethylene tetramine, then adding an additional three mols of formaldehyde to form a gel, heating the gel at about 125° C. for 16 hours, crushing, washing, and drying the resulting resin. When this resin was added to an aqueous solution containing 400 parts per million of sulfuric acid, it took up 279 milligrams of sulfuric acid per gram of resin. When used as packing in a column, the resin gave an excellent performance in adsorbing acid-forming anions from solutions passed through the columns. Dilute hydrochloric acid (400 parts per million) was passed through a column (½ inch in diameter packed to a depth of 26 inches with resin) with an absorption of 82 milligrams of hydrochloric acid per gram of resin before "breakthrough" of chloride ion. The column was then flushed with water, washed with a 5% sodium carbonate solution, and with water, and again used for removal of chloride ions with equal efficiency. Repeated use and regeneration over a long period of time did not reduce the efficiency.

EXAMPLE 3

An insoluble resin was prepared from one mol of diphenylol dimethyl methane, one mol of dimethylamine, and four mols of formaldehyde. This resin absorbed 216 milligrams of sulfuric acid per gram of resin when the resin was added to and stirred with a solution containing 400 parts per million of sulfuric acid.

EXAMPLE 4

An insoluble resin was prepared by mixing one mol of diphenylol dimethyl methane, two mols of tetraethylene pentamine, and two mols of formaldehyde, adding two more mols of formaldehyde to form a gel, heating the gel at 110° C. for 16 hours, crushing, washing, activating with dilute caustic soda solution, and drying. This resin was used in a column for the removal of chloride ions from a solution containing 483 parts per million of hydrochloric acid. Under continuous operating conditions it had an average capacity of 157 milligrams of this acid per gram of resin. From another solution containing 524 parts per million of sulfuric acid a second portion of the resin absorbed 369 milligrams of sulfuric acid per gram of resin.

90.8 cc. of the resin was placed in a 12 mm. tube and a solution containing 83 parts per million of hydrochloric acid and 388 parts per million of sulfuric acid was passed downflow through the tube. The effluent was free of chloride or sulfate ions and the pH was maintained between 6 and 7 until chloride began to appear. Up to this point the resin absorbed 1480 milligrams of hydrochloric acid and 6920 milligrams of sulfuric acid. This corresponds to an adsorptive capacity of 7110 grains of hydrogen chloride per cubic foot of resin, and at the same time of 33,250 grains of sulfuric acid per cubic foot or expressed as calcium carbonate a total anion capacity of 43,650 grains per cubic foot. Greensands, as is well known, have a capacity for calcium carbonate of only 2600 to 3000 grains of calcium carbonate per cubic foot. On the other hand, carbonaceous zeolites, such as sulfonated brown coals, are reported to possess capacities of only 6000 to 7000 grains of calcium carbonate per cubic foot.

EXAMPLE 5

An insoluble resin was made from 100 parts by weight of quebracho tannin, 46 parts of triethylene tetramine, and 200 parts of 37% aqueous formaldehyde by mixing and by heating the initial reaction product. One part of the resin was stirred in 500 parts of a solution containing 400 parts per million of sulfuric acid. From the change in acidity by titration the resin took up 223 milligrams of sulfuric acid per gram of resin.

A 12 mm. glass column was packed to a depth of 750 mm. with the above resin and a solution of 482 parts per million of hydrochloric acid passed downflow through the column. The chloride ion was entirely absent from the effluent until 76.5 milligrams of acid had been removed per gram of resin. The pH of this effluent was 6 to 7.

EXAMPLE 6

A nitrogenous resin was prepared from diphenylol propane-2 by reacting 57 parts of diphenylol propane-2 with 125 parts in all of formaldehyde to form a soluble methylol, reacting this with 93 parts of tetraethylene pentamine to form a gel, and heating the gel at 115° C. for 16 hours. The dried resin was crushed to 10/40 mesh, washed with water, and air-dried. It was then placed in a column which was 20 inches long and ¾ inch in diameter and used for the purification of an alcohol containing 0.3% of stearic acid. The solution was poured over the resin. Over 90% of the acid was removed from 250 cc. of the solution by the 45 grams of resin in the tube.

Instead of the alcoholic solution of stearic acid there was used a 0.3% solution of stearic acid in petroleum ether. The removal of acid was likewise over 90% complete from a 250 cc. sample.

EXAMPLE 7

The resin described in Example 6 was prepared in a 20/40 mesh size and placed in a column of the same dimensions as above. There was then passed downward through the column 250 grams of an alcoholic solution containing 3% of soya bean fatty acids. The effluent contained only 33% of the original acids. The column was then flushed with petroleum ether and the effluent therefrom collected and analyzed for acid. It was found that 20% of the fatty acids were thus extracted.

Similar tests were made with soya bean acids in mineral spirits, using a meta-phenylene diamine-formaldehyde resin, but it was found that 70% to 90% of the acids were found in the effluent.

EXAMPLE 8

(a) A 60 g. portion of the resin of Example 6 was placed in a ¾" diameter glass tube, through which there was passed a gaseous mixture containing 90% of nitrogen and 10% of sulfur dioxide by volume. After 5090 cc. of the mixture had been passed, the first trace of sulfur dioxide was detected in the effluent gases.

(b) A fresh portion of the same resin was used in the glass tube and a gaseous mixture containing 80% nitrogen and 20% of hydrogen sulfide was passed through the tube. The first 500 cc. of gas was free from hydrogen sulfide, but shortly thereafter this gas was detected in the effluent by slight precipitaton in a copper sulfate solution through which the effluent gases were bubbled.

EXAMPLE 9

Another portion of the resin described in Example 6 was placed in a tube having a capacity of 93 cc. Through this resin there was passed downward under gravity an aqueous solution containing 37% of formaldehyde, 786 mg. of formic acid per liter, 8 mg. of copper per liter, and 1.8 mg. of iron per liter. The pH of the effluent was constantly observed and flow maintained until the pH dropped below 6. In this way 3300 cc. of the formaldehyde solution was freed of formic acid. This material was also found to be free from iron or copper. The flow was continued and no copper detected in the next 4500 cc. of effluent. Thus, it was demonstrated that both anions and cations are removable from liquids by this type of resin.

EXAMPLE 10

A column was filled with 229 cc. of the same resin described in Example 6 and an aqueous solution containing 14.35 mg. of boric acid per liter was passed downflow through the column. The first 200 cc. portion was practically free of boron, 97.7% of the boric acid being removed. The next 1000 cc. contained less than 10% of the original boric acid. This demonstrated that even acids as weak as boric ($k=10^{-10}$) are absorbed by the phenol-formaldehyde type resins having aminoethyl substituents.

EXAMPLE 11

A nitrogeneous resin was prepared from 57 parts of diphenylol propane-2 with 8 parts of sodium hydroxide and 150 parts of water by forming a methylol compound with 45 parts of aqueous 37% formaldehyde, reacting this soluble methylol compound with 95 parts of tetraethylene pentamine, adding 40 parts of powdered starch, heating, adding 80 parts of aqueous 37% formaldehyde, and heating the resulting gelatinous mass to form an insoluble resin. The product was crushed, washed with water, with 5% soda ash solution, and again with water, and air-dried.

The absorption capacity of the above resin was determined with a sulfuric acid solution containing 400 parts per million of sulfuric acid. The resin absorbed 280 mg. of acid per gram. The resin was also used for the absorption of acid from a solution containing 73 parts per million of hydrochloric acid and 440 parts per million of sulfuric acid, which was passed through a column packed with the 20/40 mesh resin. At the "breakthrough" point, the resin had absorbed 4850 grains of hydrogen chloride and 29,000 grains of hydrogen sulfate per cubic foot, giving a total capacity of 36,150 grains as calcium carbonate per cubic foot.

EXAMPLE 12

21 cc. of the insoluble resin described in Example 4 was placed in a tube of 0.78 square cubic centimeters in cross-section filling the tube to a depth of 28 cc. There was then passed downflow through the column a solution containing 74 mg. of hydrochloric acid and 444 mg. of sulfuric acid per liter. At the start the effluent was substantially neutral and free of both chloride and sulfate ions. When 3490 cc. had been withdrawn from the column, the first trace of chloride ion appeared in the effluent. As the solution continued to flow through the column, successive samples were taken. No sulfate was found in any of these samples. Their chloride content was determined analytically with the following results. Sample No. 1, amounting to 1054 cc., contained 109 mg. of hydrochloric acid per liter. Sample No. 2, amounting to 128 cc., contained 189 mg. of hydrochloric acid per liter and sample No. 3, amounting to 129 cc., contained 216 mg. of hydrochloric acid per liter. It will be noted that the effluent contained more chloride than the solution which was being fed to the column and that the three samples had an excess of hydrochloric acid over that originally in the solution. This resulted from the fact that the chloride ion was being exchanged for sulfate ion and the effluent enriched thereby.

EXAMPLE 13

An insoluble resin prepared from diphenylol dimethyl methane, formaldehyde and tetraethylene pentamine was placed in a column of $\frac{7}{8}$ inch diameter. A total of 70 cc. of resin was required to fill the column. A solution of phosphoric acid containing 1650 parts per million of the acid was passed downflow until phosphate ions were detected in the effluent by the phospho-molybdate test. The capacity of this resin on the basis of calcium carbonate was 98,000 grains per cubic foot.

The column was backwashed with water and a solution containing 381 parts per million of calcium chloride was passed downflow through the resin. The effluent contained considerable phosphoric acid but no chloride. The resin removed all calcium from the first 200 cc. of effluent and only 160 parts per million of calcium as calcium carbonate was found in the first 1100 cc. of calcium chloride solution passed through the column. These data indicate the simultaneous absorption of both calcium and chloride ions and the replacement of phosphate ions by chloride ions.

EXAMPLE 14

56 cc. of the resin used in Example 13 was placed in a column of $\frac{7}{8}$ inch diameter and a solution containing 372 parts per million of nitric acid as calcium carbonate was passed downflow through the resin. The pH of the effluent remained above 5 until over 15,000 cc. of solution had passed through the column. At this time the pH fell abruptly and the effluent gave a positive test for nitrate with phenol sulfonic acid. The capacity of this resin for nitric acid is 49,500 grains per cubic foot as calcium carbonate.

EXAMPLE 15

56 cc. of the resin used in Example 13 was placed in a column of $\frac{7}{8}$ inch diameter. A solution containing 332 parts per million of acetic acid as calcium carbonate was passed downflow through the column. The effluent remained essentially neutral until 7350 cc. of effluent had been collected. At this point the pH dropped to 4.98 indicating the appearance of acetic acid in the effluent. The capacity of the resin at this point was 16,400 grains per cubic foot of acetic acid as calcium carbonate.

The column was washed with distilled water and a solution containing 400 parts per million of butyric acid was then passed downflow through the column. The effluent contained acetic acid but no butyric acid was detected until 750 cc. of solution had been passed.

The insoluble nitrogenous resins, which are prepared by reacting a phenol, formaldehyde, and non-aromatic non-tertiary amine, to form a gelatinous condensate and heating this condensate below the scorching point of the resin, differ in structure from the resins which have heretofore been proposed for ion exchange in that amino groups are attached to methylene groups and not directly to aromatic nuclei. They differ in physical properties, as has been related, and possess considerable advantages on this score. They also possess advantages in that they have marked basicity and high capacity. The poorest of the resins now proposed has at least as high a capacity as the best of the previously known anion exchange materials without having the poor physical properties thereof. The following table permits comparisons to be made of the absorption values against sulfuric acid by saturation technique (Sat'n.) and against hydrochloric acid by flow through a column packed with the designated resin (Column) in milligrams of acid per gram of resin. MPD designates metaphenylene diamine and HCHO indicates that the resin was made with formaldehyde. Comparisons for the different resins were made under comparable conditions of time, temperature, mesh size, rate of flow, concentrations, etc.

TABLE I

Comparison of anion capacities of different nitrogenous resins

| Resin | Adsorption values | | |
|---|---|---|---|
| | $H_2SO_4$ | | HCl |
| | Sat'n. | Column | Column |
| Methylated MPD—HCHO | 49 | | 19.6 |
| MPD—HCHO—dicyandiamide | 131 | | 42.1 |
| MPD—HCHO | 149 | | 28.3 |
| MPD—HCHO—tetramine | 192 | | 37.0 |
| MPD—haloalkane—tetramine | | 171 | 49.8 |
| Phenol—HCHO—dimethylamine | 204 | | |
| Quebracho—HCHO—tetramine | 276 | | |
| Phenol—HCHO—tetramine | 279 | | 82 |
| Do | 310 | | 90 |
| Phenol—HCHO—triaminomalonamide | 288 | | 127 |
| Phenol—HCHO—triaminoacetamide | 295 | | 111 |
| Polyphenylol alkane—HCHO—tetramine | 347 | | |
| Diphenylolpropane—HCHO—tetramine | 370 | | 151 |
| Diphenylolpropane—HCHO—pentamine | 406 | | |

It is of interest that the third compound of the list and the last have identical nitrogen contents (17%) but yet show almost a three-fold difference in results.

We claim:

1. The process of treating fluids and removing an acid-forming constituent therefrom which comprises contacting a fluid containing an acid-forming constituent with a resinous composition which is insoluble in fluids containing acidic constituents and is capable of sorbing acid-forming constituents, and thereafter removing the treated fluid from said resinous composition, said composition comprising a gelled and heat-hardened phenol-formaldehyde resin having non-aromatic aminomethyl groups as substituents of the phenyl nuclei, said resin being prepared by condensing a methylol-forming phenol with a non-aromatic amine having at least one hydrogen atom attached to the amino nitrogen atom in the ratio of between ¼ mol and 4 mols of said amine per phenylol group in said phenol and with formaldehyde in an amount at least equivalent to the combined mols of amine and of equivalents of phenol, and heat-hardening said condensation product while in the gelled condition.

2. The process of treating fluids and removing an acid-forming constituent therefrom which comprises contacting a fluid containing an acid-forming constituent with a resinous composition which is insoluble in fluids containing acidic constituents and capable of sorbing acid-forming constituents and thereafter removing the treated fluid from said resinous composition, said composition comprising a gelled and heat-hardened phenol-formaldehyde resin having aliphatically substituted aminomethyl groups as substituents of the phenyl nuclei, said resin being prepared by condensing a methylol-forming phenol with an aliphatically substituted aliphatic amine having at least one hydrogen atom attached to the amino nitrogen atom in the ratio of between ¼ mol and 4 mols of said amine per phenylol group in said phenol and with formaldehyde in an amount at least equivalent to the combined mols of amine and of equivalents of phenol, and heat-hardening said condensation product while in the gelled condition.

3. The process of treating fluids and removing and acid-forming constituent therefrom which comprises contacting a fluid containing an acid-forming constituent with a resinous composition which is insoluble in fluids containing acidic constituents and capable of sorbing acid-forming constituents and thereafter removing the treated fluid from said resinous composition, said composition comprising a gelled and heat-hardened phenol-formaldehyde resin having as substituents of the phenyl nuclei aminoalkylene aminomethyl groups, the alkylene chain of which is interrupted by —NH— to form alkylene chains of at least two carbon atoms, said resin being prepared by condensing a methylol-forming phenol with an aliphatic polyalkylene polyamine, having at least one hydrogen attached to a terminal amino nitrogen atom in the ratio of between ¼ mol and 4 mols of said amine per phenylol group in said phenol and with formaldehyde in an amount at least equivalent to the combined mols of amine and of equivalents of phenol, and heat-hardening said condensation product while in the gelled condition.

4. The process of claim 3 in which the polyalkylene polyamine is diethylene triamine.

5. The process of claim 3 in which the polyalkylene polyamine is triethylene tetramine.

6. The process of claim 3 in which the polyalkylene polyamine is tetraethylene pentamine.

7. The process of purifying a gaseous mixture containing an acid-forming constituent which comprises contacting said gaseous mixture containing an acid-forming constituent with a resinous composition which is insoluble in fluids containing acidic constituents and is capable of sorbing acid-forming constituents, and thereafter removing the treated gaseous mixture from said resinous composition, said compostion comprising a gelled and heat-hardened phenol-formaldehyde resin having non-aromatic aminomethyl groups as substituents of the phenyl nuclei, said resin being prepared by condensing a methylol-forming phenol with a non-aromatic amine having at least one hydrogen atom attached to the amino nitrogen atom in the ratio of between ¼ mol and 4 mols of said amine per phenylol group in said phenol and with formaldehyde in an amount at least equivalent to the combined mols of amine and of equivalents of phenol, and heat-hardening said condensation product while in the gelled condition.

8. The process of purifying a gaseous mixture containing an acid-forming constituent which comprises contacting said gaseous mixture containing an acid-forming constituent with a resinous composition which is insoluble in fluids containing acidic constituents and capable of sorbing acid-forming constituents and thereafter removing the treated gaseous mixture from said resinous composition, said composition comprising a gelled and heat-hardened phenol-formaldehyde resin having as substituents of the phenyl nuclei aminoalkylene aminomethyl groups, the alkylene chain of which is interrupted by —NH— to form alkylene chains of at least two carbon atoms, said resin being prepared by condensing a methylol-forming phenol with an aliphatic polyalkylene polyamine, having at least one hydrogen attached to a terminal amino nitrogen atom in the ratio of between ¼ mol and 4 mols of said amine per phenylol group in said phenol and with formaldehyde in an amount at least equivalent to the combined mols of amine and of equivalents of phenol, and heat-hardening said condensation product while in the gelled condition.

9. The process of purifying an aqueous solution containing an acidic constituent which comprises contacting an aqueous solution containing an acid-forming constituent with a resinous composition which is insoluble in fluids containing acidic constituents and is capable of sorbing acid-forming constituents, and thereafter removing the treated aqueous solution from said resinous composition, said composition comprising a gelled and heat-hardened phenol-formaldehyde resin having non-aromatic aminomethyl groups as substituents of the phenyl nuclei, said resin being prepared by condensing a methylol-forming phenol with a non-aromatic amine having at least one hydrogen atom attached to the amino nitrogen atom in the ratio of between ¼ mol and 4 mols of said amine per phenylol group in said phenol and with formaldehyde in an amount at least equivalent to the combined mols of amine and of equivalents of phenol, and heat-hardening said condensation product while in the gelled condition.

10. The process of purifying an aqueous solution containing an acidic constituent which comprises contacting a fluid containing an acid-forming constituent with a resinous composition which is insoluble in fluids containing acidic constituents and capable of sorbing acid-forming constituents and thereafter removing the treated fluid from said resinous composition, said composition comprising a gelled and heat-hardened phenol-formaldehyde resin having as substituents of the phenyl nuclei aminoalkylene aminomethyl groups, the alkylene chain of which is interrupted by —NH— to form alkylene chains of at least two carbon atoms, said resin being prepared by condensing a methylol-forming phenol with an aliphatic polyalkylene polyamine, having at least one hydrogen attached to a terminal amino nitrogen atom in the ratio of between ¼ mol and 4 mols of said amine per phenylol group in said phenol and with formaldehyde in an amount at least equivalent to the combined mols of amine and of equivalents of phenol, and heat-hardening said condensation product while in the gelled condition.

11. The process of claim 10 in which the polyalkylene polyamine is diethylene triamine.

12. The process of claim 10 in which the polyalkylene polyamine is triethylene tetramine.

13. The process of claim 10 in which the polyalkylene polyamine is tetraethylene pentamine.

HAROLD C. CHEETHAM.
ROBERT J. MYERS.